Sept. 23, 1947.  M. DICHTER  2,427,841
TELESCOPIC MAST
Filed March 22, 1945
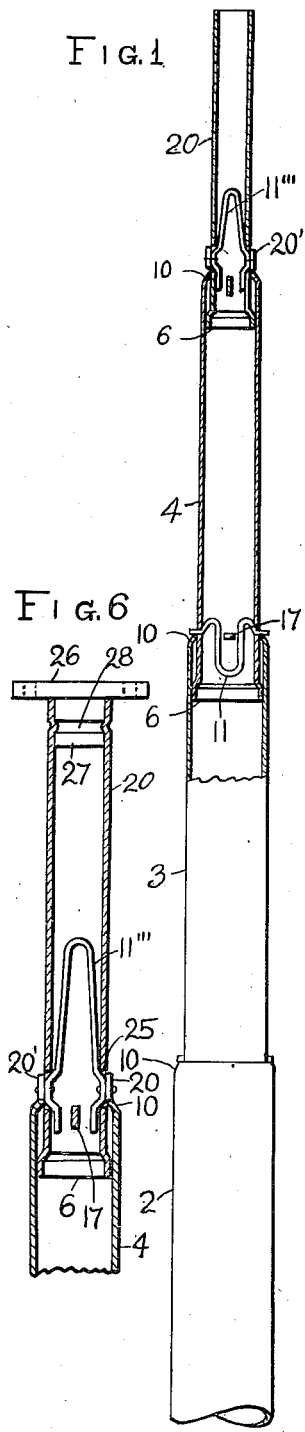
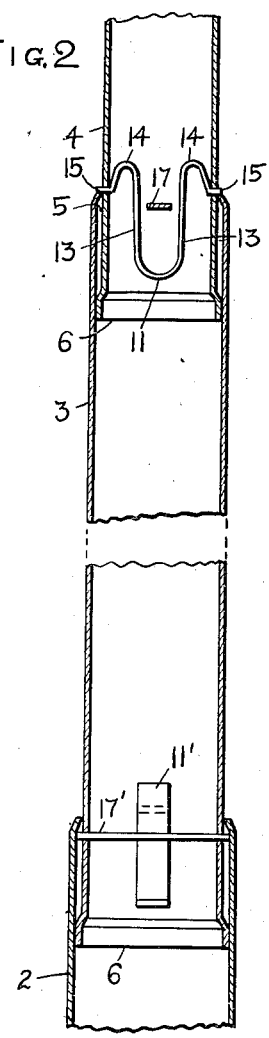
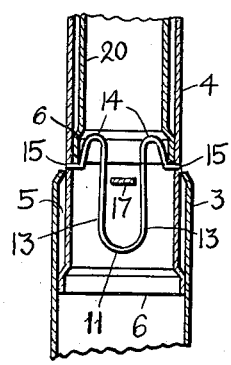
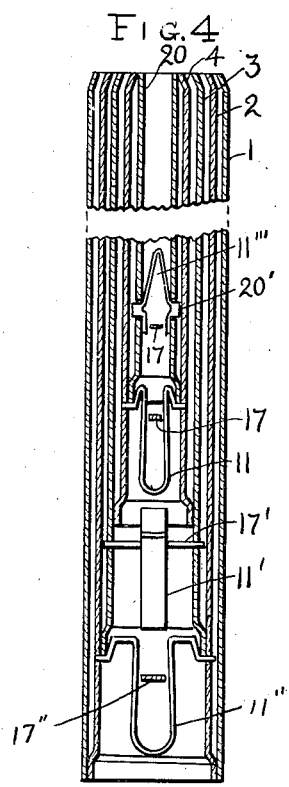
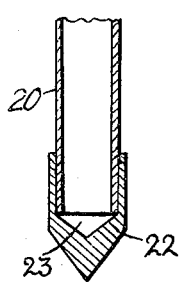
Morris Dichter
INVENTOR.
BY John P. Nikonow
ATTORNEY Patented Sept. 23, 1947

2,427,841

UNITED STATES PATENT OFFICE 2,427,841

TELESCOPIC MAST

Morris Dichter, Brooklyn, N. Y., assignor to Film Crafts Engineering Co., New York, N. Y., a partnership Application March 22, 1945, Serial No. 584,208

5 Claims. (Cl. 189—26)

1

My invention relates to telescopic masts and has particular reference to masts or rods which can be telescopically folded or collapsed for storing them in a restricted space.

My invention has for its object to provide a telescopic mast or rod which can be easily and quickly expanded to its full length and will remain in the expanded condition against forces which may tend to cause the mast or rod to collapse again. My mast is therefore particularly suitable for the use as a telescopic mast for life rafts and other similar life saving devices, also as a collapsible leg of a tripod for a photographic camera or a similar apparatus, and for various other applications in which a light and strong telescopic rod is needed.

Ordinary telescopic rods such as are used for photographic cameras, etc., are usually so constructed that they are provided with yieldable or resilient locks to maintain the rod in an expanded condition. For closing or collapsing the rod, the individual portions of the rods are moved into each other by the application of a force, sufficient to overcome the resilient resistance of the locking members at the ends of the rod units or elements. Such an arrangement has a disadvantage, however, in that the collapsing force may be accidentally applied during the normal use of the device, with a result that the rod will prematurely collapse. Such a mishap may cause, of course, serious inconvenience and even damage to the apparatus supported by the rod.

In my apparatus the individual units of the rod are positively locked in a fully expanded condition in such a manner that no amount of the axial pressure short of the breaking pressure, on the expanded rod can possibly cause the units to collapse into each other. The locking elements are so constructed, however, that each such element is released or withdrawn into an inoperative position by the inner end of the next smaller unit when the latter is moved fully into the preceding larger unit.

Another object of my invention is to provide a mast or rod of a simplified and enective construction in which the resilient locking elements and other parts of the device can be assembled into a complete mast without the necessity of using screws or bolts or of any soldering, welding or similar operations.

My invention is more fully described in the accompanying specification and drawings in which:

Fig. 1 is an elevational view of my mast in an expanded condition, partly in section;

2

Fig. 2 is an enlarged fractional sectional view of three elements shown in an expanded condition;

Fig. 3 is a similar view of three elements in a partially collapsed condition;

Fig. 4 is a sectional view of the mast in a collapsed or folded condition;

Fig. 5 is a sectional detail view of a detachable shoe.

Fig. 6 is a sectional view of the end member with a modified form of shoe.

My mast consists of several tubular members or elements 1, 2, 3, 4, and 20 of progressively decreasing diameters. The difference in diameters is such that one tubular member slides in the other member with a substantial clearance 5, comparable to the thickness of the walls of the tubular members. The inner end of each tubular member is, however, expanded at 6, forming a short cylindrical end portion which slides inside the next tubular member with a small clearance, just sufficient to allow for a free sliding movement. The outer end of each tubular member is rolled or spun to a smaller diameter at 10 for slidably engaging the outer surface of the next smaller tubular member. The tubular members can be therefore easily pulled out or expanded to form an elongated structure in the form of a mast or tapering rod.

To prevent the spontaneous collapse of such a mast or rod, I provide locking devices which automatically lock the successive tubular members in the fully expanded condition. Each lock consists of a U-shaped element 11, 11', or 11" made of a flat bar or strip of a resilient metal such as tempered steel, hard bronze, etc. The legs 13 of the locking elements are bent outwards as shown to form smaller U-shaped portions 14, terminating with projections or teeth 15, extending in opposite directions from the central U-portion 11. These teeth pass through corresponding holes in the walls of the tubular member such as 4 near its lower end and extend outwards sufficiently to form stops of detents for the converging upper end of the next lower tube such as 3. The distance between the lower end of the tube 4 and the upper end of the lower tube 3 is such as to provide sufficient bearing for maintaining alignment of the two members 3 and 4. It should be noted that the term "upper" is applied to the thin end of the rod for convenience only as this end may be also used in a lowered position. The tubular member is held in such an alignment also by a bar or pin 17, 17' or 17" passing through corresponding slots in the walls of a tubular member such as 4 and projecting outwards for slidably engaging the inner walls of the lower tube 3, the converging portion or flange 10 of the tube 3 being thus located between the projections 15 and the ends of the bar 17. The latter passes with sufficient clearance through the space between the legs 13 of the U-member 11.

The assembled unit possesses great axial rigidity, i. e., it cannot be made to collapse by the application of such axial pressure as would produce just such an effect on telescopic rods of other construction. For releasing the uppermost rod 20, the last locking element 11''' is made with added plates 20' which may be riveted or welded to the element 11'''. The plates extend through corresponding enlarged holes 25 for engaging the upper end of the next tubular rod 4, as shown more clearly in Fig. 6. The plates 20' can be manually squeezed for releasing the tubular rod 20.

The locks can be released only successively, starting at the upper end of the tube, by manually squeezing the plates 20' and thereafter pushing the tube 20 downward into the tube 4 so that the bottom expanded end 6 of tube 20 engages portions 14 and retracts projections 15 of lock 11, with the remaining locks being successively operated by the ends of tubes 4 and 3. The successive locking parts 11, 11', etc., are turned at 90° to each other so as to balance the pressure of the locks on the walls of the tubing. The process is repeated until the entire rod is telescopically folded into a single length of the bottom tube 1.

My telescopic tube can be used to advantage as a mast for a life raft or life boat, also for various other purposes, including legs for tripods such as are used with photographic cameras. In the latter case the largest tube 1 is attached to the camera stand, and the smallest tube 20 is made to rest on the ground. To protect its end, a metal shoe 22 is removably fitted on the end of the tube 20. The shoe is sharpened at the end and is provided with a hole 23, sufficiently deep to enclose the outer end of the last tube 20.

A dis-shaped shoe 26, Fig. 6, can be also attached to the rod 20 with holes for attaching the same to an object on top of the mast. The shoe 26 has a stem 27 with a groove 28 into which the tube 20 is wedged.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A telescopic rod comprising a plurality of tubular members of progressively decreasing diameters, the outer diameter of one tubular member differing from the inner diameter of the next larger tubular member to provide a clearance between the tubular members comparable to the thickness of the walls of the tubular members, the outer ends of the tubes being reduced in diameters to slidably engage the outer surfaces of the corresponding smaller tubular members, the inner ends of the tubular members being expanded to slidably engage the inner surfaces of the corresponding larger tubular members; locking members having radial projections extending outwards through corresponding holes in the walls of the tubular members for engaging the reduced ends of the corresponding larger tubular members thereby preventing inward axial movement of the smaller tubular members; the locking members having U-shaped portions engageable by the inner ends of the next smaller tubular members for withdrawing the projections from engagement with the outer ends of the larger tubular members, thereby allowing the smaller members to be moved telescopically into the larger members; and bars extending through corresponding openings in the walls of the smaller members for engaging the inner surfaces of the larger members on the inside of the reduced ends of the larger members thereby limiting the axial movements of the larger members on the smaller members.

2. A telescopic rod comprising a plurality of tubular members of progressively decreasing diameters, the outer diameter of one tubular member differing from the inner diameter of the next larger tubular member to provide a clearance between the tubular members comparable to the thickness of the walls of the tubular members, the outer ends of the tubes being reduced in diameters to slidably engage the outer surfaces of the corresponding smaller tubular members, the inner ends of the tubular members being expanded to slidably engage the inner surfaces of the corresponding larger tubular members; and locking members, each locking member being formed of a resilient U-shaped bar having radially extending ends passing through corresponding holes in the walls of the tubular members at their inner ends for engaging the outer edges of the next larger tubular members thereby preventing the axial movement of the smaller tubular members into the larger tubular members, the sides of the U-shaped locking members being adapted to be moved together by the pressure from the inner expanded ends of the next smaller tubular members.

3. A telescopic rod comprising a plurality of tubular members of progressively decreasing diameters, the outer diameter of one tubular member differing from the inner diameter of the next larger tubular member to provide a clearance between the tubular members comparable to the thickness of the walls of the tubular members, the outer ends of the tubes being reduced in diameters to slidably engage the outer surfaces of the corresponding smaller tubular members, the inner ends of the tubular members being expanded to slidably engage the inner surfaces of the corresponding larger tubular members; and locking members, each locking member being formed of a resilient U-shaped bar, the U-portion of the bar extending in a direction towards the next larger tubular member, the sides of the U-shaped bar being bent outwards and downwards to form inverted U-shaped portions, the ends of the inverted U-portions extending radially through corresponding holes in the walls of the tubular member at a relatively small distance from its expanded end for engaging the outer edge of the reduced end of the next larger tubular member thereby positively preventing telescopic axial movement of the tubular members.

4. A telescopic rod comprising a plurality of tubular members of progressively decreasing diameter, the outer diameter of one tubular member differing from the inner diameter of the next larger tubular member to provide a clearance between the tubular members comparable to the thickness of the walls of the tubular members, the outer ends of the tubes being reduced in diameters to slidably engage the outer surfaces of the corresponding smaller tubular members, the inner ends of the tubular members being expanded to form short cylindrical portions slidably engaging the inner surfaces of the next larger tubular members; and locking members, each locking member being formed of a flat bar of a resilient material bent to form a middle U-shaped portion, the sides of the U-shaped portion being bent outwards and downwards to form secondary inverted U-shaped portions, the ends of the bar extending radially in diametrically opposite directions through corresponding holes in the walls of the inner end portion of the corresponding tubular member for engaging the outer edge of the reduced portion of the next larger tubular member, the radially extending ends being arranged to be withdrawn inwardly by the application of pressure from the cylindrical expanded portion of the next smaller tubular member, the openings for the projecting ends being spaced from the inner end of the tubular member at a distance sufficient for causing the tubular members to maintain axial alignment.

5. A telescopic rod comprising a plurality of tubular members of progressively decreasing diameters, the outer diameter of one tubular member differing from the inner diameter of the next larger tubular member to provide a clearance between the tubular members comparable to the thickness of the walls of the tubular members, the outer ends of the tubes being reduced in diameters to slidably engage the outer surfaces of the corresponding smaller tubular members, the inner ends of the tubular members being expanded to form a short cylindrical portion slidably engaging the inner surfaces of the next larger tubular members; locking members, each locking member being formed of a flat bar of a resilient material bent to form a middle U-shaped portion, the sides of the U-shaped portion being bent outwards and downwards to form secondary inverted U-shaped portions, the ends of the bar extending radially in diametrically opposite directions through corresponding holes in the walls of the inner end portion of the corresponding tubular member for engaging the outer edge of the reduced portion of the next larger tubular member, the radially extending ends being arranged to be withdrawn inwardly by the application of pressure from the cylindrical expanded portion of the next smaller tubular member, the openings for the projecting ends being spaced from the inner end of the tubular member at a distance sufficient for causing the tubular members to maintain axial alignment; and a straight bar passing through corresponding holes in the intermediate tubular member at a relatively small distance from the projecting ends of the locking member for engaging the inner surface of the next larger tubular member near the reduced end.

MORRIS DICHTER.

REFERENCES CITED

The following references are of record in the file of this patent:

UNITED STATES PATENTS

| Number | Name | Date |
|---|---|---|
| 2,229,475 | Redmer | Jan. 21, 1941 |

FOREIGN PATENTS

| Number | Country | Date |
|---|---|---|
| 268,875 | Germany | Jan. 7, 1914 |